Jan. 30, 1962

T. V. DI PAOLO 3,019,361

LAMINATED MAGNETIC SHIELDING MEANS
FOR TELEVISION TUBES AND THE LIKE

Filed Nov. 15, 1957

2 Sheets-Sheet 1

INVENTOR.
THOMAS V. DI PAOLO
BY
Robert D. Sanborn
ATTORNEY

INVENTOR.
THOMAS V. DI PAOLO
BY
Robert D. Sanborn
ATTORNEY

3,019,361
LAMINATED MAGNETIC SHIELDING MEANS FOR TELEVISION TUBES AND THE LIKE

Thomas V. Di Paolo, Riverside, N.J., assignor to Philco Corporation, Philadelphia, Pa., a corporation of Pennsylvania Filed Nov. 15, 1957, Ser. No. 696,840
6 Claims. (Cl. 313—76)

The present invention relates to television type display systems and more particularly to improvements in magnetic shielding of the picture tube and deflection yoke assembly of such systems.

The present trend in television systems is to reduce the over-all length of the television picture tube first by increasing the maximum deflection angle of the beam, thereby to reduce the length of the bulb for given screen size, and secondly by reducing the length of the neck of the cathode ray tube as much as possible. In reducing the length of the neck it becomes necessary to move the cathode and first and second grids of the electron gun closer to the deflection yoke. In an electrostatically focused cathode ray tube, any fringing magnetic field of the deflection yoke occurring in the vicinity of the screen grid-cathode region of an unshielded tube may deflect the electrons of the beam before they enter the region of the focusing electrodes. This deflection of the electron beam results in a defocusing of the spot on the screen of the cathode ray tube at the edges of the picture. This defocusing effect of the fringing field is particularly noticeable in the case of the novel cathode ray tube disclosed and claimed in the copending application of Ralph A. Bloomsburgh and Wilson P. Boothroyd, filed November 18, 1957, Serial No. 697,108, now Patent No. 2,935,635. In that tube the electrostatic focusing electrodes lie physically within the deflection yoke itself. This places the cathode region very close to the active region of the deflection yoke.

While the fringing magnetic field could be confined by a magnetic shield disposed adjacent to the end of the deflection yoke and fitting closely around the neck of the tube, such a magnetic shield would have the undesirable effect of shunting a substantial portion of both the horizontal and vertical scanning fields around the neck of the tube. This would reduce the power available to deflect the beam by as much as 20% to 30%. Such a loss of deflection power cannot be tolerated particularly at the horizontal scanning frequency. Furthermore, such a shield would have the effect of shunting the vertical deflection field more than the horizontal deflection field for the reason that the vertical deflection coils normally lie outside the horizontal coils and hence have a higher reluctance path across the neck of the tube. This is exactly the reverse of what is required since maximum vertical deflection of the beam necessary to form a conventional raster is normally less than maximum horizontal deflection. As a result, for a given fringing field the defocusing is less noticeable at the top or bottom edges of the picture than it is at the left or right sides of the picture.

Other known forms of shielding means require more space than can be tolerated in the extremely compact deflection assemblies required to maintain minimum over-all tube dimensions.

Therefore it is an object of the present invention to provide a novel magnetic shielding member which is effective at both high and low frequencies.

It is a further object of the present invention to provide a shielding member which introduces only minimum losses of deflection power particularly at the high frequencies.

Still another object of the invention is to provide a shielding member in which the amount of magnetic shielding afforded to fields of two different frequencies can be varied independently of one another.

An additional object of the present invention is to provide an efficient shielding member which occupies very little space on the neck of a cathode ray tube.

These and other objects of the invention are achieved by providing a novel laminated shield member, one portion of which affords principally shading or eddy-current shielding of magnetic fields at high frequencies and another portion of which provides principally conductive or low reluctance shielding of low frequency fields.

For a better understanding of the present invention together with other and further objects thereof reference should now be made to the following detailed description which is to be read in conjunction with the accompanying drawings in which.

Figure 1:
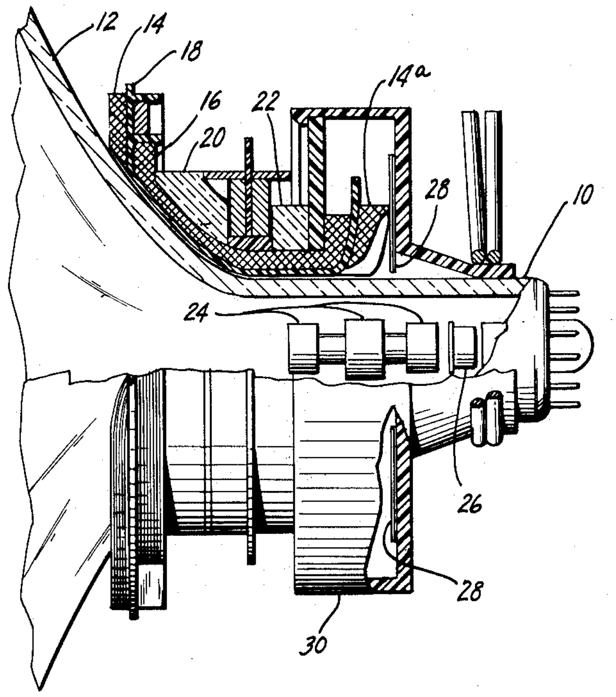
FIG. 1 is a view partially in section of a cathode ray tube and deflection yoke assembly incorporating the novel shielding member of the present invention.
Figures 2A, 2B, 8:
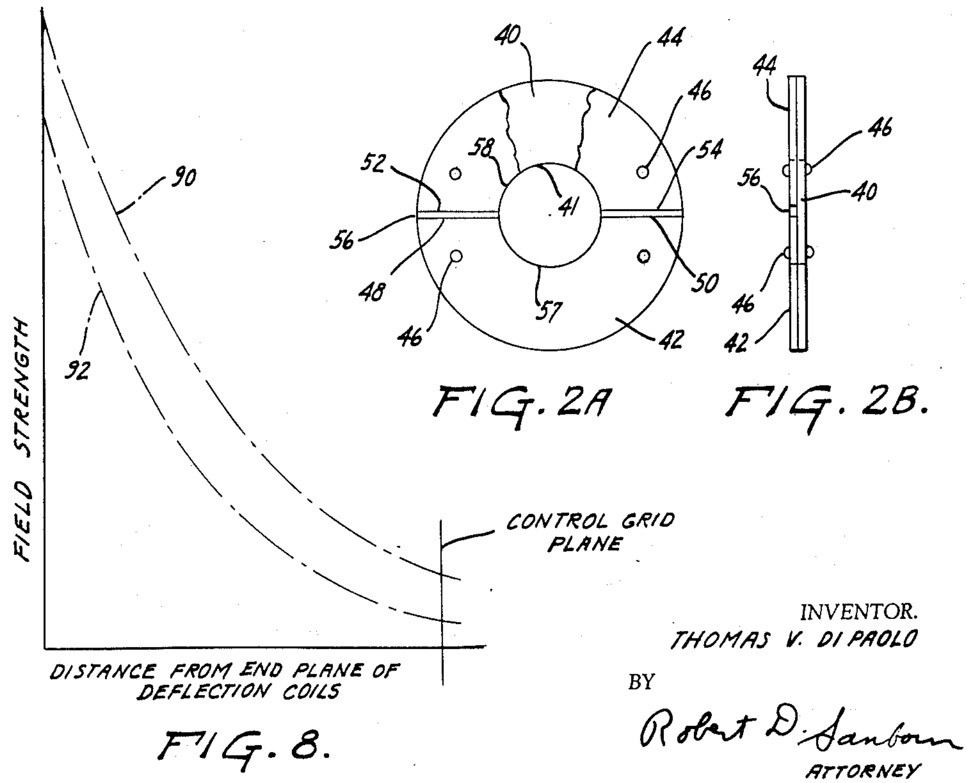
FIG. 2A is a view of the shielding member of the present invention as viewed from the rear of the cathode ray tube.
FIG. 2B is a side elevation of the shielding member of FIG. 2A.
Figure 5:
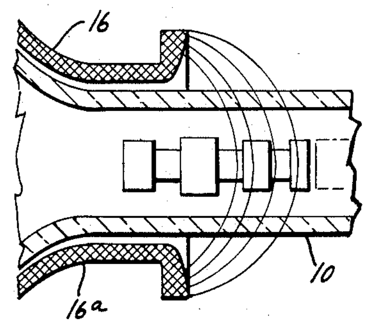
Figure 6:
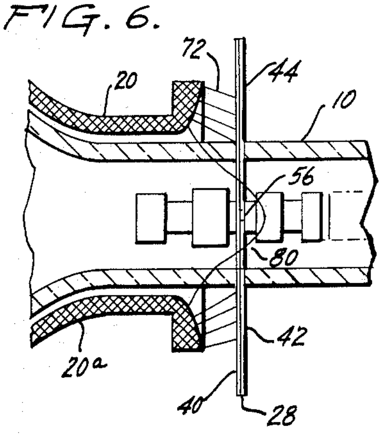
Figure 7:
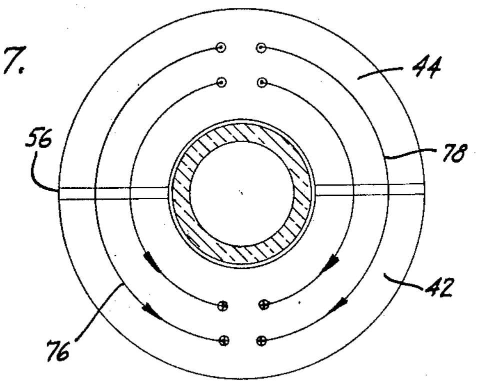

FIGS. 5–7 are fragmentary views of the cathode ray tube and deflection yoke assembly of FIG. 1 showing the effect of the shielding member on low frequency fields; and FIG. 8 is a graph showing the reduction in fringing flux which may be accomplished through the use of the novel shielding member of the present invention. Turning now to FIG. 1, member 10 is the neck portion of a cathode ray tube on which the deflection yoke assembly incorporating the present invention is mounted. The neck flare of the cathode ray tube is shown at 12. The end turns of one of the horizontal deflection coils are shown at 14 and 14*a*. One vertical deflection coil is shown at 16. An insulating coil form 18 separates the horizontal deflection coils 14 and 16 and serves to maintain these coils in their proper position on the neck 10 of the cathode ray tube. Members 20 and 22 represent the magnetic yoke core which serves as the external magnetic path for flux set up by horizontal and vertical deflection coils.

The three electrodes identified by the reference numeral 24 form the electrostatic focusing means for the tube shown in FIG. 1. The beam forming assembly including the cathode, control grid and screen grid are shown generally at 26.

The laminated shielding member which comprises the present invention is shown in cross-section at 28. Shield member 28 is apertured to receive the neck 10 of the cathode ray tube and is held in place adjacent the end turns of the deflection coils by the insulating housing 30 which mechanically covers the terminals of the deflection coils and associated components. A portion of the lower half of housing 30 is broken away to show that shield member 28 extends completely around tube 10. Shield member 28 is shown as abutting the end turns 14*a* of the horizontal deflection coil. Where space permits it may be desirable to space the shield member 28 from end turns 14*a* by a fraction of an inch to reduce the shunting effect of this shield 28 on the deflection fields.

Turning now to FIGS. 2A and 2B for a more complete description of the shield member it will be seen that this shield member comprises a disc 40 of conductive material such as aluminum. Disc 40 is formed with an aperture 41 to receive the neck portion 10 of the cathode ray tube. Secured to disc 40 are two half-discs 42 and 44. Half-discs 42 and 44 may be secured to disc 40 by means of rivets 46 which pass through both members. Half-discs 42 and 44 are formed of a material having high magnetic permeability such as silicon-steel. The edge portions 48 and 50 of half-disc 42 are spaced from the confronting edge portions 52 and 54 of half-disc 44 to form a gap. The purpose of this gap is to add reluctance in the path of the low frequency vertical deflection field, a portion of which is shunted by shielding member 28. The curved edge surfaces 57 and 58 of half-discs 44 and 42 respectively define an aperture which has substantially the same diameter as aperture 41.

Turning once again to FIG. 1, the shield member 28 shown in FIGS. 2A and 2B is disposed with the conductive member 40 adjacent the end turns 14*a* of the horizontal deflection coils. The gap 56 is disposed transverse to the direction of the low frequency vertical deflection field across the neck 10 of the cathode ray tube. Since the vertical deflection field normally lies in a horizontal plane, slot 56 would normally be oriented in a vertical direction.

Figure 3:
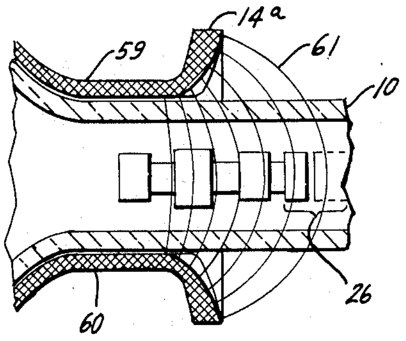
FIGS. 3 and 4 are fragmentary views of the cathode ray tube and deflection yoke assembly of FIG. 1 showing the effect of the shielding member on high frequency fields.
Figure 4:
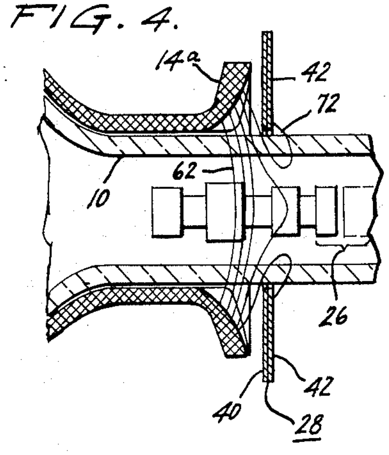

FIGS. 3 and 4 illustrate the shielding effect of member 28 for high frequency fields. These two figures are fragmentary views of the deflection assembly shown in FIG. 1. For simplicity portions of the deflection assembly which are not essential to an understanding of the functioning of shielding member 28 are not shown in FIGS. 3 and 4. In FIGS. 3 and 4 the plane of the section has been rotated from the plane of the section of FIG. 1 to show more clearly the horizontal deflection coil 59, only the end turns 14 and 14*a* are visible in FIG. 1, and the other horizontal deflection coil 60 which is paired with coil 59.

Turning first to FIG. 3, if no shielding is employed for the horizontal deflecting coils the magnetic flux which causes the deflection for the beam in the horizontal direction will fringe from the end region of coils 59 and 60 as shown by flux lines 61. This fringing flux passes through the region occupied by the beam generating means 26. The electron beam is relatively sensitive to stray magnetic fields at this point due to the low velocity of the electrons in the beam in this portion of the electron gun. Deflection of the electron beam in the region between the cathode and the first electrode of focusing means 24 will cause the position of the beam entering the first focusing electrode to shift at the frequency of the horizontal deflection field. This will result in aberrations in the beam which show up as defocusing of the spot at the edges of the picture.

FIG. 4 illustrates the field from the end region of the horizontal deflection coils 59 and 60 with the novel shield member 28 in place. The eddy currents set up in the highly conductive member 40 by the approximately 15 kc. horizontal scanning field tend to confine the flux from the end regions of coils 59 and 60 to the region of the neck 10 to the left of the shield member 28 as shown at 62 in FIG. 4. Therefore the novel laminated shield of the present invention shunts much less of the horizontal deflection field around the neck of the tube than would a single layer shield of high permeability material at the same location. This minimizes the loss of horizontal deflection power in the shield member 28. The eddy current losses in the highly conductive member 40 are much lower than the losses which would occur in a steel shield, for example. Therefore placing the highly conductive member 40 between the steel half-discs 42 and 44 and the deflection coils greatly reduces the electrical losses which are reflected into the deflection coil circuit. As a result, the apparent Q of the coil is lowered only very slightly by the novel laminated shield of the present invention. Some flux will tend to fringe through the relatively large aperture 41 which is provided to receive the neck 10 of the cathode ray tube.

However, a substantial part of this fringing flux will terminate on the high permeability half-discs 42 and 44 as shown at 72. These half-discs provide a much lower reluctance path around the neck of tube 10 than the relatively long air gap through the neck 10 of the tube. It should be remembered that slot 56 lies parallel to the plane of the horizontal deflection flux and hence does not affect the reluctance of the path just mentioned. The amount of flux thus shunted around the neck of tube 10 is a very small portion of the total flux set up by coils 59 and 60 since most of the flux in the edge of the deflection field is prevented from fringing through aperture 41 in the manner just described.

FIGS. 5, 6 and 7 illustrate the shielding effect afforded by member 28 to low frequency fields. In these three figures only the vertical deflection coils 16 and 16*a* are shown in order to simplify the drawing. It is to be understood that the section plane for FIGS. 5–7 lies at right angles to the section plane for FIGS. 3 and 4. FIG. 5 shows the fringing field which would occur without shield member 28. FIGS. 6 and 7 illustrate the shielding effects of member 28. Member 28 is shown in full in FIG. 6 in order to illustrate the position of slot 56. The eddy currents induced in conductive disc 40 as a result of the relatively low frequency scanning field are usually not sufficient adequately to confine the field to the region to the left of shielding member 28. Therefore some of the fringing flux 72 passes through conductive member 40 to the low reluctance members 42 and 44. As shown in FIG. 7 this leakage flux is conducted around the neck of the tube in paths 76 and 78. The flux flowing in paths 76 and 78 represents a loss of vertical deflection power since flux in these paths is shunted around the space occupied by the electron beam and does not assist in the vertical deflection of the beam. The amount of this shunted flux may be controlled by properly selecting the size of gap 56 in the otherwise low reluctance path afforded by members 42 and 44. In general, the size of this gap will represent a compromise between the amount of defocusing which can be tolerated at the edge of the pictures as a result of residual fringing flux 80 and the permissible loss of vertical deflection power resulting from this shunting effect of the shielding means. It has been determined experimentally that the shunting effect of the laminated shield member 28 to the low frequency deflection field can be changed measurably by including gap 56. This is so even though there are other relatively large air gaps in the path of flux which follows paths 76 and 78.

While it is at present believed that the shielding effect for the high and low frequencies results from the changes in flux paths just described, applicant does not wish to be limited to this description which is offered only as a possible explanation of results fully established experimentally. Comparative tests have shown that the novel laminated shield member provides at least the same amount of shielding as a simple low reluctance shield. This shielding is accomplished with substantially less loss of deflecting power and with less change in the effective Q of the deflection coils. Experimental results have shown also that the laminated shield of the present invention affords substantially better shielding to the beam generating means 26 than a simple conductive shield.

The graph of FIG. 8 is a plot of the field strength along the axis of tube 10 as a function of the distance from the end plane of the deflection yoke for a shield member 28 placed ¼" from the end plane of the yoke assembly. The position of the control grid for the system shown in FIG. 1 is shown as a convenient reference point in evaluating the curve. Curve 90 represents the field strength without shield member 28 in place. Curve 92 represents the field strength with shield member 28 in place. It should be noted that the amount of fringing flux at the control grid region has been reduced by a factor of approximately 3. At the same time the field strength at the end plane of the deflection coils is reduced only slightly.

While the invention has been described with reference to a single embodiment thereof, it will be apparent that various modifications and other embodiments thereof will occur to those skilled in the art wtihin the scope of my invention. Accordingly I desire the scope of my invention to be limited only by the appended claims.

What is claimed is:

1. In combination with a cathode ray tube system having magnetic deflection means for creating a relatively high frequency magnetic deflection field in a first plane and a relatively low frequency magnetic field in a second plane, a laminated shielding member comprising a highly electrically conductive, approximately flat, sheet-like member apertured to receive the neck of said cathode ray tube and disposed in adjacency with said deflection means, and a high permeability, approximately flat, sheet-like member secured to said highly electrically conductive sheet-like member on the side remote from said deflection means, said high permeability member being apertured to receive the neck of said cathode ray tube and being further formed with a gap extending transverse to said low frequency field and intersecting said aperture, said gap and said aperture dividing said high permeability member into two magnetically separate portions.

2. In a television display system, in combination with a cathode ray tube, a set of horizontal deflection coils energized at a relatively high frequency and providing a field in a first direction transverse to the beam axis of said cathode ray tube, and a set of vertical deflection coils energized at a relatively low frequency and providing a field in a second direction transverse to the beam axis of said cathode ray tube, a low loss magnetic shield assembly comprising a highly electrically conductive, non-magnetic, approximately flat, sheet member disposed transversely to said axis in proximity to one end of said two sets of deflection coils, said sheet member being apertured to receive the neck of said cathode ray tube, and a pair of coplanar plates of high permeability material disposed parallel to said sheet member on the side of said sheet member remote from said coils, selected portions of an edge of one of said plates being disposed in spaced juxtaposition to corresponding portions of said other plate to define a gap extending substantially transversely to said axis and transverse to the field set up by said vertical deflection coils.

3. In a system for creating a relatively high frequency field transverse to a first axis and a relatively low frequency field in the same region of space transverse to said axis and said first field, means for minimizing fringing of said field in the direction of said axis comprising a highly electrically conductive, non-magnetic, approximately flat, sheet member disposed transversely to said axis at a point adjacent one end of said region and a pair of coplanar plates of high permeability material disposed parallel to said sheet member on the side of less intense field, one edge of one of said plates being disposed in spaced juxtaposition to a confronting edge of the other of said plates thereby to define a gap extending substantially transversely to said axis and transverse to said low frequency field.

4. In combination with a cathode ray tube system having magnetic deflection means for creating a relatively high frequency magnetic deflection field in a first plane and a relatively low frequency magnetic field in a second plane, a laminated shielding member comprising a highly electrically conductive, approximately flat, sheet-like member apertured to receive the neck of said cathode ray tube and disposed adjacent said deflection means, and a high permeability, approximately flat, sheet-like member secured to said highly electrically conductive sheet-like member in parallel abutting relationship on the side remote from said deflection means, said high permeability member being apertured to receive the neck of said cathode ray tube and being further formed with a gap extending transverse to said low frequency field and intersecting said aperture, said gap and said aperture dividing said high permeability member into two magnetically separate portions.

5. In combination with a cathode ray tube, a set of horizontal deflection coils energized at a relatively high frequency and providing a field in a first direction transverse to the beam axis of said cathode ray tube, and a set of vertical deflection coils energized at a relatively low frequency and providing a field in a second direction transverse to the beam axis of said cathode ray tube, a low loss magnetic shield assembly comprising a highly electrically conductive, non-magnetic, approximately flat, sheet member disposed transversely to said axis in proximity to one end of said two sets of deflection coils, said sheet member being apertured to receive the neck of said cathode ray tube, and a pair of coplanar plates of high permeability material disposed parallel to and in abutting relationship with said sheet member on the side of said sheet member remote from said coils, selected portions of an edge of one of said plates being disposed in spaced juxtaposition to corresponding portions of said other plate to define a gap extending substantially transversely to said axis and transverse to the field set up by said vertical deflection coils.

6. In a system for creating a relatively high frequency field transverse to a first axis and a relatively low frequency field in the same region of space transverse to said axis and said first field, means for minimizing fringing of said field in the direction of said axis comprising a highly electrically conductive, non-magnetic, approximately flat, sheet member disposed transversely to said axis at a point adjacent one end of said region and a pair of coplanar plates of high permeability material disposed parallel to and in abutting relationship with said sheet member on the side of less intense field, one edge of one of said plates being disposed in spaced juxtaposition to a confronting edge of the other of said plates thereby to define a gap extending substantially transversely to said axis and transverse to said low frequency field.

References Cited in the file of this patent

UNITED STATES PATENTS

| | | |
|---|---|---|
| 2,761,989 | Barkow | Sept. 4, 1956 |
| 2,763,804 | Morrell | Sept. 18, 1956 |
| 2,793,311 | Thomas | May 21, 1957 |
| 2,813,212 | Grundmann | Nov. 12,1957 |
| 2,837,674 | Barkow | June 3, 1958 |
| 2,861,209 | Biggs | Nov. 18, 1958 |